United States Patent [19]
Brooks

[11] 3,905,717
[45] Sept. 16, 1975

[54] BORING MACHINE

[75] Inventor: Daryl G. Brooks, Fresno, Calif.

[73] Assignee: Porta-Tool, Incorporated, Clovis, Calif.

[22] Filed: June 4, 1973

[21] Appl. No.: 366,603

[52] U.S. Cl. .............................. 408/107; 408/709
[51] Int. Cl.² ........................................ B23B 41/12
[58] Field of Search ....... 408/81, 709, 94, 104, 107, 408/98, 80

[56] References Cited
UNITED STATES PATENTS

| | | | |
|---|---|---|---|
| 1,028,600 | 6/1912 | Pedrick | 408/709 X |
| 1,862,866 | 6/1932 | Storm | 408/14 |
| 1,868,440 | 7/1932 | Arp | 408/709 X |
| 2,917,101 | 12/1959 | Glasspoole | 408/14 X |
| 3,273,423 | 9/1966 | Rottler | 408/709 X |
| 3,331,266 | 7/1967 | Brooks | 408/80 |
| 3,711,212 | 1/1973 | Kuck | 408/14 X |

Primary Examiner—Donald R. Schram
Assistant Examiner—Z. R. Bilinsky
Attorney, Agent, or Firm—Huebner & Worrel

[57] ABSTRACT

A boring machine having a frame; a shaft mounted for rotational and endward movement on the frame, the shaft having a work end; a boring tool affixed on the work end of the shaft; a work object seat adjustable secured on the frame in substantial axial alignment with the shaft; a cylinder retaining assembly borne by the frame for movement to and from the seat; a motor mounted in the frame in rotationally driving relation to the shaft; and a shaft advancing mechanism secured on the frame in connection with the shaft.

10 Claims, 10 Drawing Figures

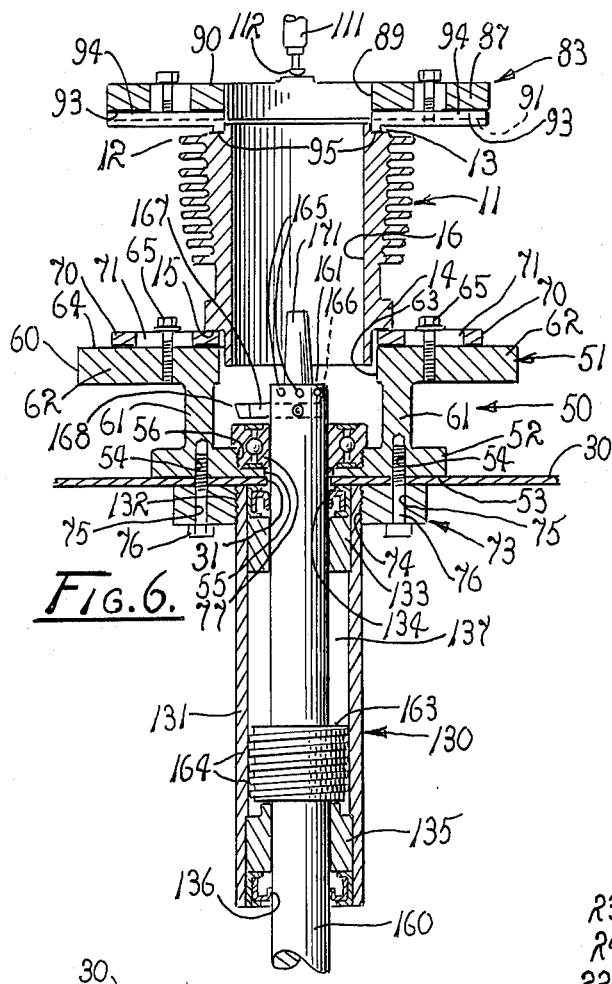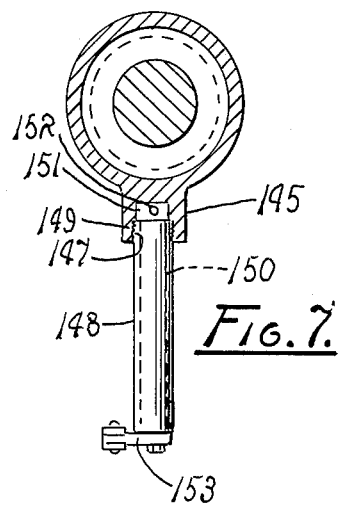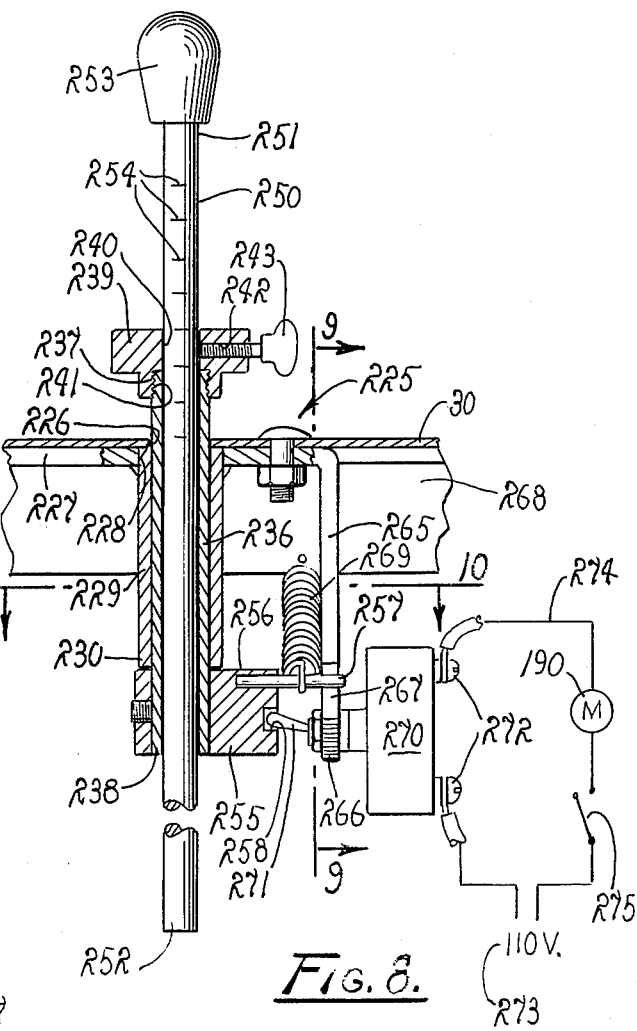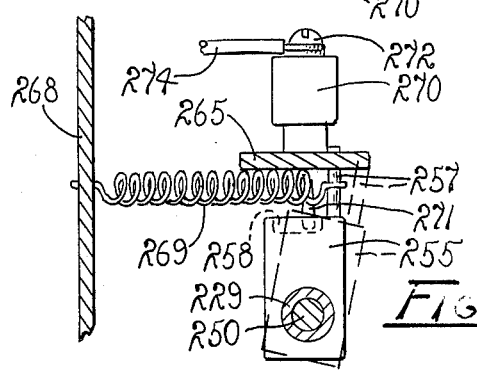

BORING MACHINE

BACKGROUND OF THE INVENTION

The present invention relates to a boring machine and more particularly to such a machine which is specifically adapted to bore cylinders of a wide variety of interior and exterior dimensions and is capable of doing so rapidly with a precision not heretofore achievable with conventional boring machines. The boring machine is adapted for use, as will subsequently be described, with the "Centering Tool" of U.S. Pat. No. 3,836,277 issued Sept. 17, 1974.

Machines for boring the cylinders of internal combustion engines have long been employed in the reconditioning of such engines for continued efficient operation. The applicant's U.S. Pat. No. 3,331,266 discloses a novel boring tool having a unique advancing mechanism to which reference will subsequently be made.

Conventional boring machines are designed to bore cylinders within a rather restricted range of dimensions. Such conventional boring machines are not adapted for rapid boring of even those cylinders within their limited range. Burdensome and time consuming procedures must be employed in order precisely to position the cylinder with respect to the boring tool. It is frequently necessary during the boring operation to recheck the positioning of the cylinder and the tool in order to insure that boring is conducted within acceptable tolerances.

These existent deficiencies with conventional boring machines are compounded where businesses specialize in the repair of motorcycles. The range in sizes of motorcycle cylinders commonly in use varies from those having quite small internal and external dimensions to those having dimensions corresponding to those of full size automobile cylinders. No conventionally available boring machine is capable of adequately boring cylinders of all sizes within this broad range. Therefore, such businesses must utilize two or more boring machines in order adequately to handle this entire range of cylinder sizes. The purchase and maintenance of such machines is, of course, expensive. Furthermore, variations in the procedures which must be employed in operating the machines impede their convenient use.

Therefore, it has long been recognized that it would be desirable to have a boring machine which could be employed efficiently and conveniently to bore cylinders of a wide range of sizes and which could do so rapidly with a precision not heretofore achievable with conventional boring machines.

SUMMARY OF THE INVENTION

In view of the foregoing, it is an object of the present invention to provide an improved boring machine.

Another object is to provide such a machine which is adapted to bore cylinders of a wide range of internal and/or external dimensions.

Another object is to provide such a machine which facilitates precise positioning of the boring tool for the depth of cut desired.

Another object is to provide such a machine which permits rapid, precise positioning of a cylinder relative to the boring tool.

Another object is to provide such a machine which allows a cylinder rapidly to be locked in position for boring.

Another object is to provide such a machine which maximizes the speed and precision with which the boring operation is performed.

Another object is to provide such a machine which employs the hydraulic drive mechanism of the applicant's U.S. Pat. No. 3,331,266 to insure an extremely smooth and accurate bore.

Another object is to provide such a machine which is adjustable precisely to define the axial length of the boring operation desired and which automatically terminates the boring operation when this selected length has been bored.

A further object is to provide such a machine which minimizes the investment required in repairing and reconditioning internal combustion engines.

Further objects and advantages are to provide improved elements and arrangements thereof in a device for the purposes described which is dependable, economical, durable and fully effective in accomplishing its intended purposes.

BRIEF DESCRIPTION OF THE DRAWINGS

FIG. 6 is a fragmentary vertical section taken on line 6—6 in FIG. 3.

FIG. 7 is a fragmentary horizontal section taken on line 7—7 in FIG. 1.

FIG. 8 is a fragmentary vertical section taken on line 8—8 in FIG. 4 and schematically illustrating an electric circuit utilized in the boring machine.

FIG. 9 is a fragmentary vertical section taken from a position indicated by line 9—9 in FIG. 8.

FIG. 10 is a fragmentary horizontal section taken from a position indicated by line 10—10 in FIG. 8.

DESCRIPTION OF THE PREFERRED EMBODIMENT

Figure 1:
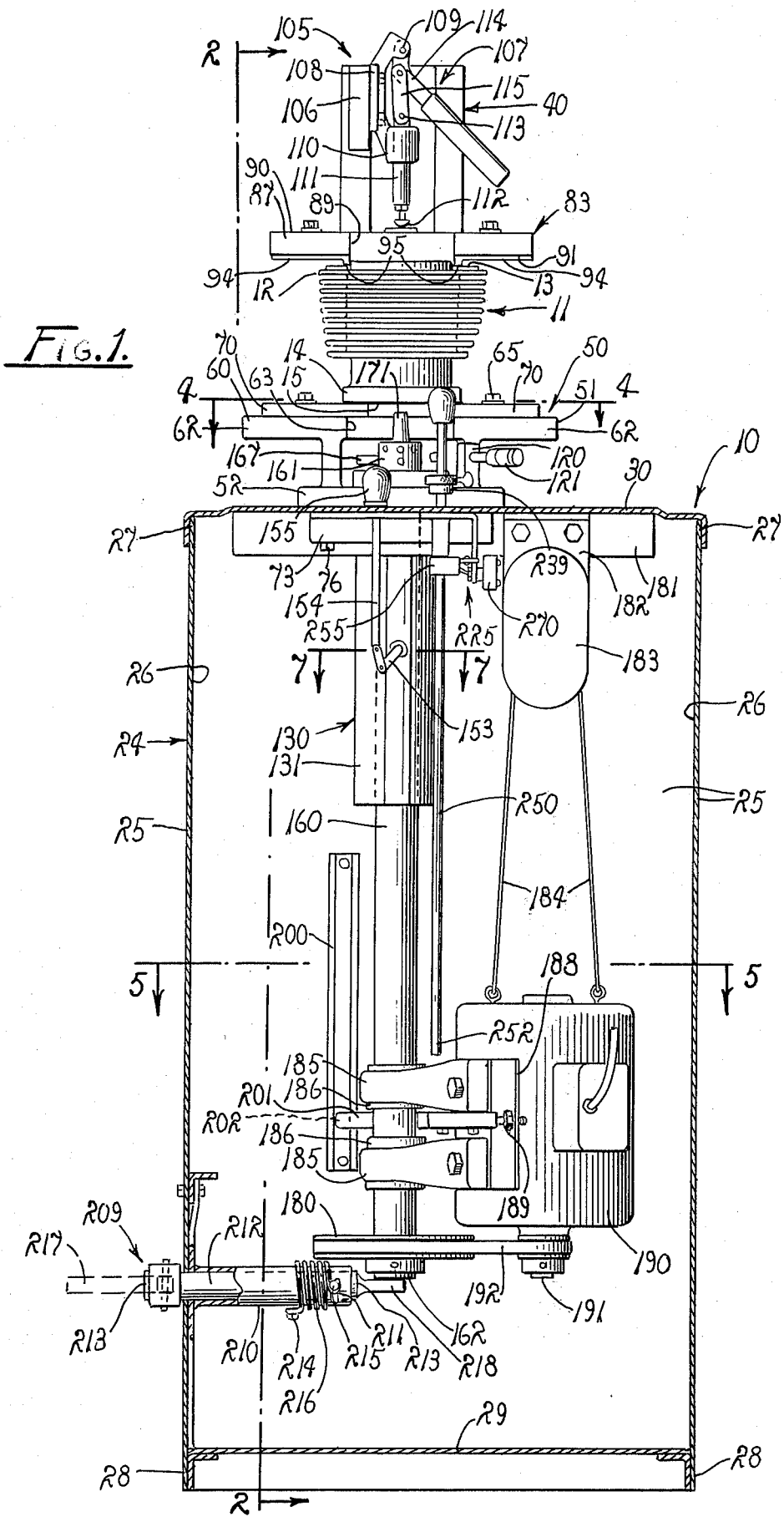
FIG. 1 is a vertical section of the boring machine of the present invention.

Referring more particularly to the drawing, the boring machine of the present invention is generally indicated by the numeral 10 in FIG. 1. The boring machine is adapted to mount an internal combustion engine cylinder 11 as a work piece, as will hereinafter be made more clearly apparent. The cylinder has a head end 12 having a circumscribing machined peripheral seat 13. The cylinder has a block end 14 having a similar circumscribing machined peripheral seat 15. A cylindrical bore 16 extends longitudinally through the cylinder, as best shown in FIG. 6.

While the boring machine 10 can be supported in any suitable manner, it conveniently provides a box-like frame or cabinet 24. The cabinet has four integral upstanding side walls 25. Each of the side walls has an interior surface 26 and an upper end 27. Each of the side walls has a reinforced, ground engaging lower end 28. The cabinet mounts a floor 29 horizontally interconnecting the side walls adjacent to the lower ends thereof. A reinforced table or top wall 30 is secured on the upper ends 27 of the side walls. A shaft passage 31 is provided in the top wall adjacent to the center thereof. One of the side walls has a substantially rectangular access opening 32 having a door 33 hingedly mounted in covering relation thereto. A latch assembly 34 is borne by the door for selective retention of the door in covering relation to the access opening.

The cabinet 24 has an upstanding support or channel member 40 mounted on the reinforced top wall 30 adjacent to the side wall 25 remote from the door 33 of the cabinet. The channel member has a spine portion 41 having a machined face 42 facing the shaft passage 31 of the top wall. The spine portion has a vertical mounting slot 43, communicating with the face 42, of a predetermined length spaced from the top wall. A key 44 is affixed on the face of the spine portion adjacent to the slot. The spine portion has several screw threaded bores 45 extending horizontally therethrough in spaced relation adjacent to the top wall.

Figure 2:
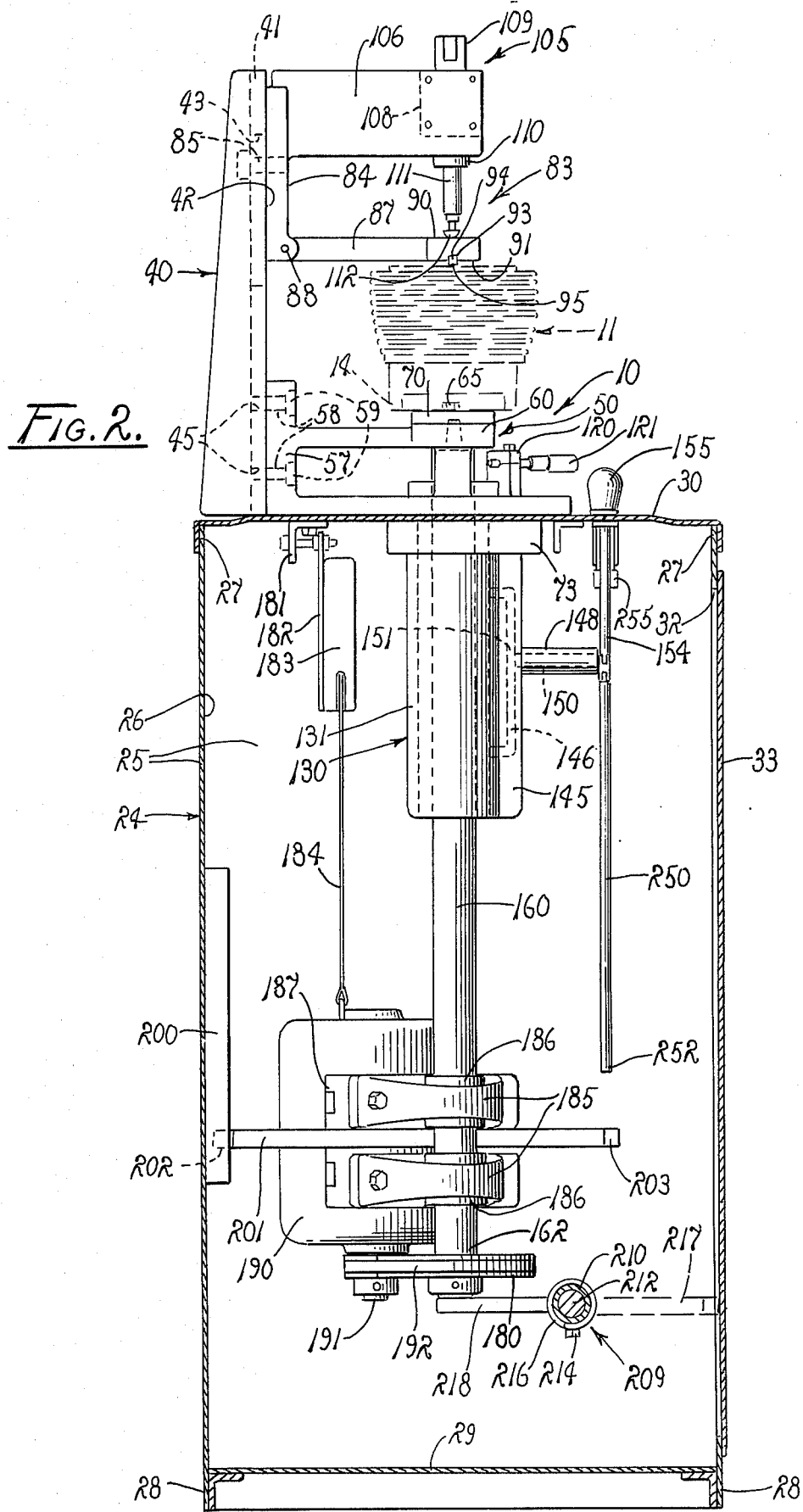
FIG. 2 is a vertical section taken from a position indicated by line 2—2 in FIG. 1.
Figure 3:
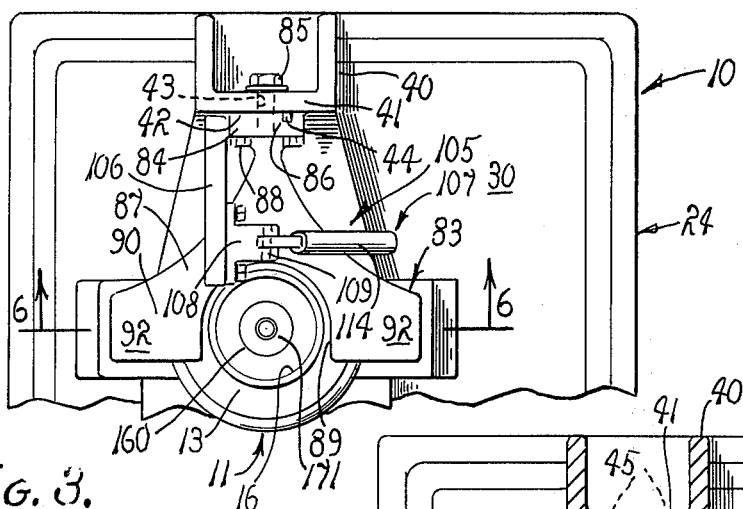
FIG. 3 is a fragmentary top plan view of the boring machine.

A clamp or jig assembly is generally indicated by the numeral 50 in FIG. 2. The jig assembly has a cylinder seat or mount 51. The mount includes a base plate 52 having a lower surface 53. Four screw threaded bores 54 extend through the lower surface and into the plate. The base plate has a central passage 55 having a larger, screw threaded counterbore 56 in axial alignment therewith. The base plate is mounted with its lower surface in facing engagement with the top wall 30 of the cabinet 24 and with the central passage in axial alignment with the shaft passage 31 of the top wall. The mount has an integral right angularly related back plate 57 having bolt holes 58 extending therethrough in positions corresponding to those of the screw threaded bores 45 of the channel member 40. Bolts 59 are individually received through the bolt holes 58 and screw threadably tightened to the bores 45 to secure the back plate in position against the machined face 42 of the channel member.

A cylinder support plate 60 is integrally extended from the back plate in substantially parallel spaced relation to the base plate 52 and is supported at its remote end by a pair of posts 61 interconnecting the base plate and the support plate. The support plate has a pair of lateral extensions 62 adjacent to the posts and a recess 63 intermediate the extensions. The extensions have machined upper surfaces 64. A guide bolt is secured in each extension for vertical adjustment to and from its respective upper surface.

Figure 4:
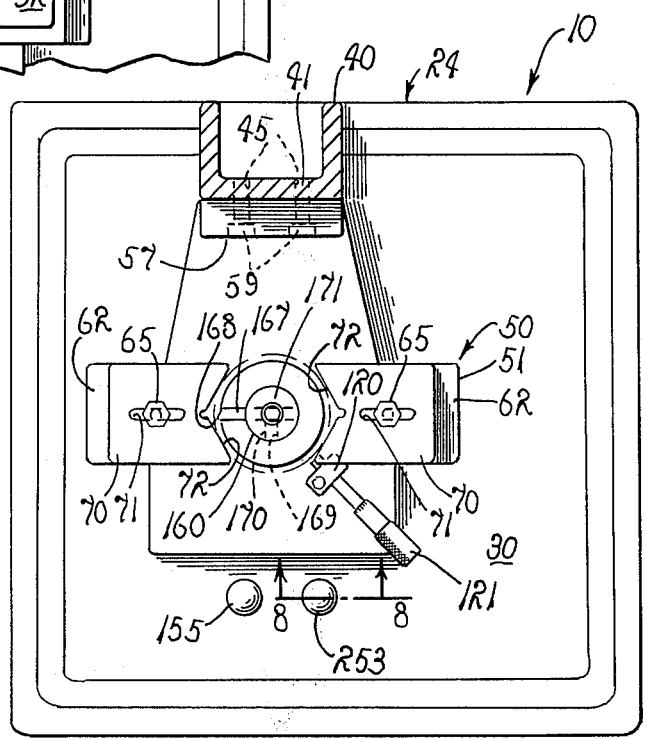
FIG. 4 is a horizontal section taken from a position indicated by line 4—4 in FIG. 1.

A slide plate 70, having a longitudinal slot 71, is slidably mounted on each of the extensions 62 of the support plate 60 with its respective guide bolt 65 extending through its slot, as best shown in FIGS. 4 and 6. The slide plates are adapted to be locked into selected positions by their respective guide bolts being screw threadably tightened into the support plate. When locked in position, the upper surfaces of the slide plates define a common plane. Each slide plate has a notch 72 at the end thereof adjacent to the recess 63 of the support plate.

An internal mounting plate 73, having a central screw threaded bore 74 extending therethrough, is secured within the cabinet 24 against the top wall 30, as best shown in FIG. 6. The mounting plate has four bolt holes 75 extending therethrough in positions corresponding to the screw threaded bores 54 of the base plate 52. Four bolts 76 are individually received in the bolt holes and screw threadably tightened into the bores of the base plate so as securely to retain the cylinder mount 51 in position on the top wall of the cabinet. The central screw threaded bore 74 of the internal mounting plate is thus maintained in axial alignment with the central passage 55 of the base plate. A bearing 77 is screw threadably secured in the counterbore 56 of the base plate in axial alignment with the central passage 55 thereof.

The jig assembly 50 has a cylinder retaining assembly which is generally indicated by the numeral 83 in FIG. 2. The assembly includes a slide member 84, having a guide bolt 85 adjustably extending from one side thereof, mounted on the spine portion 41 of the channel member 40 with the bolt extending through the mounting slot 43 thereof. The side of the slide member having the guide bolt has a vertical keyway 86 therein which slidably engages the key 44. Thus, the slide member is adjustable along a vertical path controlled by the key in the keyway and is adapted to be secured by the bolt in a selected position in facing engagement with the machined face 42. A cylinder pressure arm 87 is fastened on the slide member opposite the guide bolt by a pivotal connection 88 so as to be pivotal to and from the cylinder mount 51. The pressure arm has a recess 89 at the end thereof remote from the pivotal connection in a position permitting its alignment with the recess 63 of the support plate 60. The arm has an upper surface 90, a lower surface 91 and lateral extensions 92 on opposite sides of the The lower surface of each of the lateral extensions has a longitudinal guide passage 93 communicating with the recess. The passages are in alignment substantially parallel to the face 42 of the spine portion 41. An adjusting bar 94 is individually mounted for slidable movement in each of the guide passages. Each of the bars has a downwardly extending contact stud 95 at the end thereof adjacent to the recess.

The cylinder retaining assembly 83 further includes a pressure applying mechanism generally indicated by the numeral 105 in FIG. 1. The mechanism has an arm 106 affixed on the slide member 84 at the upper end thereof and right angularly extended therefrom. An over center clamp 107 is fastened on the remote end of the arm. The clamp has a mounting bracket 108 affixed on the remote end of the arm. The bracket has an upper pivotal connection 109 and a lower guide sleeve 110 integrally extending therefrom. A rod 111 is slidably received in the sleeve for vertical movement to and from the cylinder mount 51. The rod has a lower longitudinally adjustable foot end 112 and an upper connection end 113. An angled lever arm 114 is pivotally mounted at one of its ends on the pivotal connection 109. A link 115 pivotally interconnects the lever arm and the upper pivot end of the rod. Thus, in the conventional manner vertical positioning of the lever arm controls slidable movement of the rod within the guide sleeve 110.

A mount 120 is secured in upstanding relation on the base plate 52 of the cylinder mount 51 in spaced relation to the central passage 55 of the base plate. A conventional, adjustable micrometer 121 is fastened on the upper end of the mount in predetermined relation to the central passage of the base plate.

An advancing mechanism, similar to that disclosed by the applicant's U.S. Pat. No. 3,331,266, is generally indicated by the numeral 130 in FIG. 6. A substantially cylindrical housing 131, having an externally screw threaded upper end 132, is mounted on the internal mounting plate 73 with its upper end 132 screw threadably secured in the central bore 74 of the mounting plate. As shown best in FIG. 6, an upper bushing 133 is mounted in the interior of the housing adjacent to the screw threaded end thereof. An upper bushing seal 134 is fastened outwardly of the upper bushing and in axial alignment therewith. A lower bushing 135, having a lower bushing seal 136, is affixed on the interior of the housing adjacent to the distal end thereof. The upper and lower bushings define a fluid chamber 137 within the housing which is adapted to contain hydraulic fluid.

A bypass conduit 145 is provided on one side of the cylindrical housing 131 extending from a position adjacent to the upper bushing 133 to a position adjacent to the lower bushing 135. The conduit has an internal passage 146 extending therethrough which communicates with the fluid chamber 137 at the opposite ends thereof. As shown in FIG. 7, the conduit has a screw threaded bore 147 intermediate its opposite ends. A sleeve 148, having a screw threaded end 149, is mounted in the bore by its threaded end. A shaft 150, having a valve 151 affixed on one end thereof, is rotationally received in the sleeve with the valve in the passage 146. A valve bore 152 extends transversely through the valve. The shaft extends outwardly of the sleeve and has a lever arm 153 mounted at the remote end thereof. As shown best in FIG. 2, a connecting rod 154 is pivotally connected to the remote end of the lever arm and extends upwardly through the top wall 30 of the cabinet 24. A control knob 155 is mounted on the remote end of the connecting rod in rested engagement on the top wall so as to maintain the shaft in an orientation in which the valve bore is out of fluid transferring communication with the passage 146.

A tool mounting shaft 160, having a work end 161 and an opposite power end 162, is mounted for rotational and endward movement in the bearing 77, upper bushing 133 and lower bushing 135 so that the work end thereof extends through the central passage 55 of the base plate 52. The shaft defines an axis of rotation which is precisely normal to the plane defined by the upper surfaces of the slide plates when locked in position. A piston 163 is co-axially mounted on the shaft so that its periphery contacts the housing. Helical grooves 164 are inscribed about the periphery of the piston. A plurality of shaft positioning bores 165 extend transversely into the tool mounting shaft adjacent to its work end 161. A cutting tool passage 166 extends transversely through the shaft just below the shaft positioning bores in substantial right angular relation to the axis of rotation of the mounting shaft. A cutting tool 167, having a cutting edge 168, is slidably received in the cutting tool passage so as to be laterally extendible from the mounting shaft, as best shown in FIGS. 4 and 6. A screw threaded bore 169 extends into the mounting shaft normal to and in communication with the tool passage, as shown in FIG. 4. A set screw 170 is screw threadably received in the set screw bore for locking engagement with the cutting tool. A frustoconical projection 171 is integrally affixed on the work end 161 of the mounting shaft extending upwardly in axial alignment with the shaft, as best shown in FIG. 6.

Figure 5:
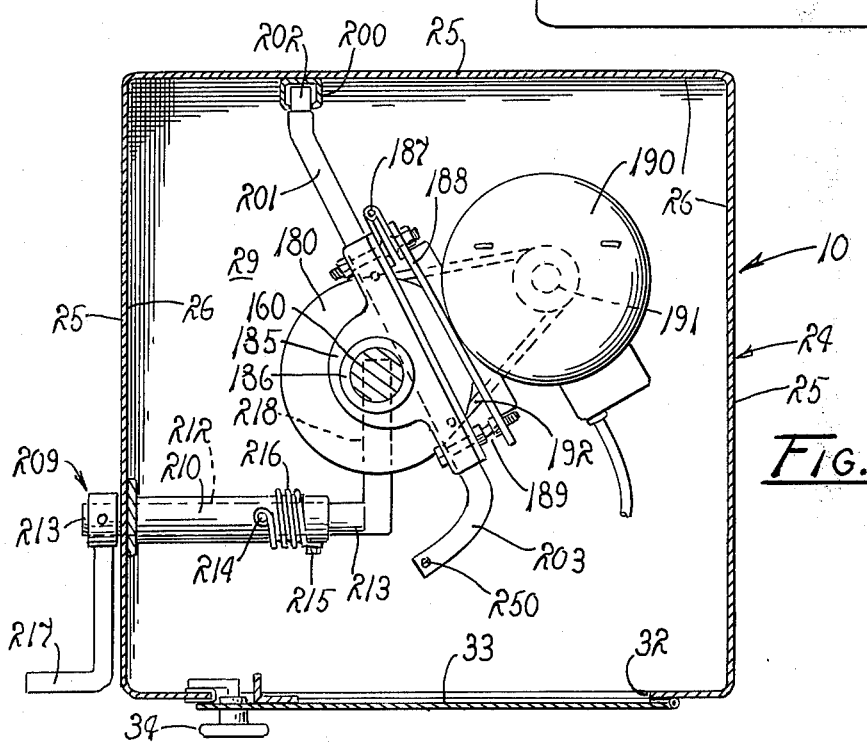
FIG. 5 is a horizontal section taken from a position indicated by line 5—5 in FIG. 1.

A pulley 180 is mounted on the power end 162 of the tool mounting shaft 160 for rotational movement therewith. An angle iron 181 is bolted on the top wall 30 within the cabinet 24 adjacent to the advancing mechanism 130 and remote from the door 33, as best shown in FIG. 2. A bracket 182 is fastened on the angle iron. A counterbalance mechanism 183 is mounted on the bracket end extends downwardly therefrom. A counterbalance cable 184 is operably extended through the counterbalance mechanism and downwardly therefrom. A pair of motor mounts 185, each having a bearing 186 therein, are secured on the tool mounting shaft 160 with the shaft extending rotationally through the bearings. A vertical hinge 187 is affixed on the motor mounts at one end thereof, as best shown in FIG. 5. A hinge plate 188 is mounted on the hinge for pivotal movement to and from the motor mounts. An adjustable bolt assembly 189 interconnects the motor mounts and the hinge plate for controlled positioning of the plate relative to the motor mounts.

An electric motor 190 is borne by the hinge plate 188 and has a downwardly extending drive shaft 191 defining an axis of rotation parallel to that of the tool mounting shaft 160. A drive belt 192 interconnects the drive shaft and the pulley 180 of the tool mounting shaft in driving relation. Adjustment of the bolt assembly 189 controls tension of the belt about the drive shaft and pulley. The electric motor is connected to the ends of the counterbalance cable 184 so that the weight of the motor is partially supported by the counterbalance mechanism 183.

A guide rail 200 is fastened in vertical attitude on the upstanding side wall 25 of the cabinet 24 remote from the door 33. A switch actuating or guide arm 201, having a traveler 202 mounted at one end thereof and an opposite curved portion 203, is mounted on the motor mounts 185 and extended transversely of the cabinet. The traveler of the arm is slidably received in the guide rail. The curved portion of the arm is configured so as to locate the end thereof at the position as shown in FIG. 5 as will subsequently be more fully explained.

A foot lever assembly is generally indicated by the numeral 209 in FIG. 5. The assembly has a mounting sleeve 210 secured on a side wall 25 on the left as viewed in FIG. 5 and extending inwardly of the cabinet 24 in a horizontal attitude. The sleeve has a slot 211 provided therein in a position adjacent to the inwardmost end of the sleeve. The slot extends in an arc concentric to the axis of the sleeve. A rod 212, having opposite ends 213, is rotationally received in the sleeve with the opposite ends extending outwardly of the sleeve. A spring pin 214 is affixed on the sleeve extending radially therefrom in spaced relation to the slot. A second spring pin 215 is mounted on the rod extending radially therefrom. The pin 215 is received in the slot so as to extend outwardly of the sleeve. A spring 216 extends helically about the sleeve and is connected at one of its ends to spring pin 214 and at the other of its ends to spring pin 215 so as to urge the rod rotationally into a position with the spring pin 215 engaging one end of the slot, as will subsequently be more fully described.

As shown in FIG. 5, a foot lever 217 is secured on the opposite end 213 of the rod 212 which is outside the cabinet 24. A lever arm 218 is mounted on the other end of the rod within the cabinet extending normal to the rod and with its remote end engageable with the power end 162 of the tool mounting shaft 160. As shown in FIGS. 1 and 2, the tool mounting shaft 160, mounting the cutting tool 167 and the electric motor 190, is in its retracted position so that the power end 162 of the shaft is in engagement with the remote end of the lever arm 218 of the foot lever assembly 209. As shown best in FIG. 6, in this retracted position the cutting tool is retracted within the cylinder mount 51. As will become more clearly apparent, the shaft is positionable in an advanced position in which the cutting tool is extended well beyond the cylinder mount and the piston 163 engages the upper bushing 133 of the advancing mechanism 130.

A control linkage or power shut off mechanism is generally indicated by the numeral 225 in FIG. 8. A hole 226 is provided in the top wall 30 of the cabinet 24 adjacent to the control knob 153. A mounting plate 227, having a hole 228 therein, is fastened on the top wall within the cabinet so that the hole 228 is an axial alignment with hole 226. A mounting sleeve 229 is secured, as by welding, in the hole 228 in abutment with the top wall so that the interior thereof communicates with hole 226. The mounting sleeve has a remote end 230 extending downwardly into the interior of the cabinet.

An adjustment sleeve 236, having an upper, screw threaded end portion 237 and a lower end portion 238, is slidably received in the mounting sleeve 229 extending upwardly through the hole 226 in the top wall 30. A stop collar 239, having an axial passage 240 extending therethrough an an internally threaded coupling 241 in axial alignment with the passage, is mounted on the threaded end portion of the sleeve with the end portion screw threadably received in the internally threaded coupling on the collar. Thus, the passage of the collar and the interior of the adjustment sleeve are in axial alignment. An internally threaded bore 242 extends radially from the passage through the collar to communicate with the exterior thereof. A tightening bolt 243 is screw threadably received in the bore for adjustment to and from the passage.

A throw rod 250, having an upper end 251 and an opposite lower end 252, is slidably received in the adjustment sleeve 236 with the upper end extending through and above the stop collar 239 and the lower end extending downwardly into the interior of the cabinet 24 vertically above the opposite curved end portion 203 of the guide arm 201. A control knob 253 is mounted on the upper end of the throw rod. A plurality of gradations 254 are inscribed on the throw rod below the control knob individually to indicate the upper limit of the boring operations to be performed, as will subsequently be more fully described. A block 255, having an upper surface 256, is affixed on the lower end portion 238 of the adjustment sleeve 236. A cam follower 257 is mounted on and extends laterally from the block with respect to the adjustment sleeve. A switch socket 258 is provided in the block adjacent to the cam follower, as best shown in FIG. 8.

A bracket 265 integrally extends from the mounting plate 277 in right angular relation downwardly from the top wall 30 of the cabinet 24. The bracket has a lower portion 266 having an angled cam way 267, as shown best in FIG. 9. An angle iron bracket 268 is fastened on the top wall of the cabinet extending downwardly therefrom on the opposite side of bracket 265 from the cam way. A tension spring 269 interconnects the angle iron bracket and the cam follower 257 so as to retain the follower in engagement with the angled cam way, as shown in FIGS. 8 and 9. A motor control switch box 270 is mounted on the lower portion 266 of the bracket 265 adjacent to the cam way. The switch box has a toggle switch 271 extending through the lower portion of the bracket and operably received in the switch socket 258 of the block 255. The toggle switch is adapted to be motivated between a lowered "on" position and a raised, "off" position shown in FIG. 8. The switch box operably mounts a pair of electrical terminals 272. An electrical power source 273 is schematically represented in FIG. 8. An electrical circuit 274 interconnects the power source, terminals of the switch box, and the electric motor 190. A master switch 275 is schematically represented in FIG. 8 in the circuit for the selective supply of power to the switch box from the source.

OPERATION

The operation of the described embodiment of the subject invention is believed to be clearly apparent and is briefly summarized at this point. In order to prepare the boring machine 10 for the boring of the cylinder 11, the tool mounting shaft 160 is lowered to the retracted position. Where the shaft is in an advanced position, retraction of the shaft is accomplished by simply pulling upwardly on the control knob 155 of the bypass conduit 145 to position the valve bore 152 in registry with the internal passage 146. The weight of the electric motor 190, not overcome by the counterbalance mechanism 183, and the weight of the shaft itself cause the piston 163 gravitationally to be pressed downwardly against the hydraulic fluid within the fluid chamber 137. Thus, the fluid is forced upwardly through the passage 146 and subsequently back into the fluid chamber above the piston thus permitting the piston to travel downwardly in the fluid chamber with the shaft until the piston is received in rested relation against the lower bushing 135, as shown in FIG. 6. In this retracted position the cutting tool 167 is positioned within the cylinder mount 51 immediately above the bearing 77. When the retracted position has been reached, the control knob 155 is returned to a rested position on the top wall 30 so as, again, to obstruct the passage 146.

Precise positioning of the cutting edge 168 of the cutting tool 167 is rapidly accomplished by first loosening the set screw 170 within the bore 169 so as to permit slidable positioning of the cutting tool within the cutting tool passage 166. A rod or similar item is then inserted in one of the convenient shaft positioning bores 165 and employed to rotate the shaft and therefore the cutting tool so as to position the cutting edge in juxtaposition with respect to the micrometer 121. The micrometer is operated in the conventional manner precisely to position the cutting edge for the desired boring operation. The set screw is thereafter readjusted to lock the cutting edge of the cutting tool in this selected boring position.

Subsequently, the cylinder 11 is mounted in the jig assembly 50 for boring. In order to mount the cylinder, the cylinder retaining assembly 83, including the cylinder pressure arm 87 and the pressure applying mechanism 105, is moved out of the way to an elevated position on the channel member 40 and locked in position by tightening the guide bolt 85 to secure the slide member 84 in position. Subsequently, with the pressure arm raised, the peripheral seat 15 of the block end 14 of the cylinder is received in supported relation on the slide plates 70 of the cylinder support plate 60, as shown in FIG. 6. The pressure arm is then temporarily rested on the head end 12 of the cylinder. A centering tool, not shown, is received through the recess 89 of the arm and positioned on the frustoconical projection 171 of the tool mounting shaft 160 within the cylinder. The tool is employed precisely to center the cylindrical bore 16 of the cylinder in axial alignment with the axis of rotation of the shaft. Thereafter, the slide plates 70 are positioned with their notches 72 in engagement with the cylinder and the bolts 65 are tightened to lock the slide plates in position so as securely to retain the cylinder in the centered position.

The slide member 84 is then lowered and locked in position, using the guide bolt 85 as described, so that the cylinder pressure arm 87 is rested on the cylinder 11 in a substantially horizontal attitude, as shown in FIG. 2. The arm is then adjusted with respect to the head end 12 of the cylinder. The adjusting bars 94 are laterally adjusted so as to position their contact studs 95 in engagement with the peripheral seat 13 of the head end of the cylinder, as shown in FIG. 6. The lever arm 114 of the over center clamp 107 is drawn downwardly so as to cause the adjustable foot end 112 of the rod 111 to engage the upper surface 90 of the cylinder pressure arm thereby locking the cylinder in position in the jig assembly 50.

The power shut off mechanism 225 is then adjusted to control the upper limit of the boring operation to be performed within the cylindrical bore 16 of the cylinder 11. Adjustment of the power shut off mechanism is quickly and easily accomplished by loosening the bolt 243 within the internally threaded bore 242 of the stop collar 239 so as to permit slidable movement of the throw rod 250 within the adjustment sleeve 236. Using the gradations 254 appearing on the throw rod, the throw rod is vertically positioned by grasping the control knob 253. The selected gradation is positioned in the same plane as the upper surface of the stop collar. The tightening bolt 243 is then again tightened to engage the throw rod so as to lock it into position in the adjustment sleeve.

Using the control knob 253, the throw rod is then forced downwardly carrying the adjustment sleeve 236 therewith until the stop collar 239 contacts the top wall 30 of the cabinet 24. This repositioning simultaneously causes the cam follower 257 to travel along the angled cam way 267 to the lowered position. The toggle switch 271 is simultaneously moved to the lowered, on position.

In order to perform the boring operation as rapidly as possible, the foot lever assembly 209 is operated by forcing the foot lever 217 downwardly so as to cause the lever arm 218 to engage the power end 162 of the tool mounting shaft 160. Simultaneously, the control knob 155 is raised to position the valve bore 149 in registry with the passage 146 of the bypass conduit 145. Continued downward movement of the foot lever forces the shaft upwardly sufficiently to position the cutting edge 168 of the cutting tool 167 in contact with the cylindrical bore 16 at the block end 14 thereof. The simultaneous upward movement of the piston 163 within the fluid chamber 137 causes hydraulic fluid to be displaced from above the piston, through the passage 146 and into the chamber below the piston so as to accommodate upward movement of the shaft and piston. When the cutting tool has been positioned as desired, the control knob 155 is repositioned against the top wall 30 so as again to obstruct the bypass conduit 145. With the boring machine adjusted as described, the axial length of the boring operation to be performed corresponds directly to the distance between the lower end 252 of the throw rod and the end of the opposite curved portion 203 of the guide arm 201 plus the play in the toggle switch 271.

To initiate operation of the boring machine 10, the master switch 275 is closed to cause electrical power to flow from the power source 273, through the electrical circuit 274 and the switch box 270 with the toggle switch 271 in the on position, to operate the electric motor 190. The tool mounting shaft 160 is thereby rotated through the drive belt 192 in connection with the electric motor so as rapidly to rotate the cutting tool and the piston 163 with the rotating shaft. As disclosed in the applicant's U.S. Pat. No. 3,331,266, the rotating piston 163 causes the hydraulic fluid within the fluid chamber 137 above the piston to travel downwardly within the helical grooves 164 of the piston thereby transferring the fluid downwardly in the chamber to a position between the piston and the lower bushing 135. This transfer of hydraulic fluid smoothly and accurately raises the piston and, thus, the shaft during boring by the cutting tool 167 within the cylindrical bore 16.

When the cutting tool 167 has been motivated the full length of the cylindrical bore 16 thus completing one boring operation, the opposite curved portion 203 of the guide arm 201 contacts the lower end 252 of the throw rod 250 so as to carry the adjustment sleeve 236 upwardly in the mounting sleeve 229 a minimal distance until the cam follower 257 snaps into the upper position of the angled cam way 267 and the toggle switch 271 is switched to the upper, off position shown in FIGS. 8 and 9. Thus, the elctric motor 190 is stopped causing rotation of the shaft to cease.

The shaft 160 is again lowered to the retracted position by raising the control knob 155 so as to permit the weight of the electric motor and shaft, not balanced by the counterbalance mechanism 183, to draw the piston 163 and shaft downwardly within the fluid chamber 137. This forces the hydraulic fluid in the chamber below the piston through the passage 146 for collection above the piston within the fluid chamber, as previously described. Additional boring operations can be performed by again adjusting the cutting tool 167 and operating the boring machine 10 as previously described. When use of the machine has been completed, the master switch 275 is opened to prevent the flow of electrical power through the circuit 274 from the power source 273.

Since the jig assembly 50 of the boring machine 10 is adjustable vertically and laterally to a unique extent and since the vertical length of travel of the cutting tool 167 is unusually great, the range of sizes of cylinders which can be bored is well beyond that possible with any single conventional boring machine. Furthermore, experience with the boring machine has shown that the average time required to mount the cylinder 11 in the jig assembly, adjust the cutting tool and power shut off mechanism 225 for the cut desired, and to finish the boring operation is 5 minutes. In a commercial operation, the machine can be employed to bore a motorcycle cylinder with excellent precision in 1 minute, 15 seconds.

Therefore, the boring machine of the present invention makes possible the convenient and efficient boring of cylinders of a range of sizes not heretofore possible with any single, conventional boring machine and permits such boring operations to be performed rapidly and with a precision not previously achievable.

Although the invention has been herein shown and described in what is conceived to be the most practical and preferred embodiment, it is recognized that departures may be made therefrom within the scope of the invention, which is not to be limited to the illustrative details disclosed.

Having described my invention what I claim as new and desire to secure by Letters Patent is:

1. In a cylinder boring machine, the combination of a frame; a shaft mounted for rotation and endward movement in the frame, the shaft having a work end and an opposite power end; a cutting tool affixed on the work end of the shaft; a drive motor mounted in driving relation to the power end of the shaft; a cylinder support plate mounted on the frame defining a plane substantially normal to the axis of rotation of the shaft; a support borne on the frame adjoining the cylinder support plate; a slide member mounted on the support for adjustment toward and from the support plate; a pressure arm affixed on the slide member and positionable in spaced juxtaposition to the support plate; a pressure applying mechanism mounted on the slide member adjacent to the pressure arm; means mounted on the frame in engagement with the shaft for advancing the work end of the shaft between selected retracted and advanced cutting positions with respect to the support plate upon rotation of the shaft; a motor control switch mounted in the frame and a switch actuating arm extended from the shaft; and a cutting position control linkage mounted on the frame in operable connection with the switch, the linkage having an endwardly adjustable throw rod mounted in the frame in alignment with the arm extended from the shaft.

2. The combination of claim 1 in which the advancing means includes a housing mounted on the frame concentrically about the shaft defining an internal fluid chamber and helical grooves are provided on the shaft within the chamber.

3. The combination of claim 2 in which a foot lever assembly is borne by the frame, said assembly mounting a lever arm selectively engageable with the power end of the shaft to raise the cutting tool to the desired cutting position.

4. The combination of claim 3 in which a micrometer is affixed on the cylinder support plate in endwardly adjustable relation to the cutting tool.

5. In a cylinder boring machine, the combination of a frame having a reinforced top wall; a tool mounting shaft, having a work end and an opposite power end, mounted for rotational and endward movement in the frame with the work end thereof extending above the top wall; a mount rotationally secured on the shaft adjacent to its power end for endward movement therewith; a motor fastened on the mount in rotational driving relation to the power end of the shaft; means for preventing rotational movement of the mount and permitting endward movement thereof with the shaft; a counterbalance mechanism mounted on the frame and connected in substantial supporting relation to the motor; a cylinder support plate mounted on the top wall defining a plane substantially normal to the axis of rotation of the shaft; an upright support fastened on the top wall; a slide member mounted for vertical adjustment on the support in spaced relation to the support plate; a pressure arm affixed on the slide member and positionable in vertical alignment with the support plate; a pressure applying mechanism mounted on the slide member above the pressure arm; a cutting tool adjustably secured on the work end of the shaft for movement therewith between the top wall and the pressure applying mechanism; and means mounted on the frame about the shaft for advancing the shaft upon rotation of said shaft by the motor.

6. The combination of claim 5 in which the advancing means has a cylindrical fluid housing mounted on the top wall in sealing relation to a portion of the shaft and a piston, having fluid transferring helical grooves inscribed thereabout, is affixed on the portion of the shaft within the housing.

7. The combination of claim 6 in which the motor is connected to a source of electrical energy in series with a control switch, an arm is secured on the mount and horizontally extended therefrom in a predetermined position and an elongated throw rod is slidably mounted in the frame in controlling relation to the switch, said rod having a lower end in predetermined vertically spaced relation to the arm.

8. The combination of claim 7 in which the rod is adjustably mounted in the frame to position the lower end thereof a selected distance from the arm.

9. The combination of claim 8 in which a foot lever assembly is borne by the frame, said assembly mounting a lever arm selectively engageable with the power end of the shaft to raise the cutting tool to the desired cutting position.

10. The combination of claim 9 in which a micrometer is affixed on the top wall in endwardly adjustable relation to the cutting tool.

* * * * *

UNITED STATES PATENT OFFICE
CERTIFICATE OF CORRECTION

Patent No. 3,905,717   Dated September 16, 1975

Inventor(s) Daryl G. Brooks

It is certified that error appears in the above-identified patent and that said Letters Patent are hereby corrected as shown below:

[ 57 ] Abstract,

Line 5, delete "adjustable" and insert --- adjustably---.

Column 4,

Line 28, after "the" in the first instance, insert --- recess ---.

Column 7,

Line 26, delete "an" in first instance, and insert --- and ---.

Signed and Sealed this twenty-fifth Day of November 1975

[SEAL]

Attest:

RUTH C. MASON
*Attesting Officer*

C. MARSHALL DANN
*Commissioner of Patents and Trademarks*